United States Patent [19]

Kondo

[11] Patent Number: 5,741,593
[45] Date of Patent: Apr. 21, 1998

[54] MAGNETIC RECORDING MEDIUM

[75] Inventor: Hirofumi Kondo, Kanagawa, Japan

[73] Assignee: Sony Corporation, Tokyo, Japan

[21] Appl. No.: 701,833

[22] Filed: May 17, 1991

[51] Int. Cl.$^6$ ..................................................... G11B 5/66
[52] U.S. Cl. ................................... 428/422; 428/694 TF; 428/900
[58] Field of Search ................................... 428/422, 694, 428/695, 900, 694 TF; 568/615

[56] References Cited

U.S. PATENT DOCUMENTS

| | | | |
|---|---|---|---|
| 4,592,948 | 6/1986 | Kohmoto et al. | 428/216 |
| 5,091,249 | 2/1992 | Nishikawa et al. | 428/336 |
| 5,091,269 | 2/1992 | Kondo et al. | 428/695 |
| 5,093,211 | 3/1992 | Kudo et al. | 428/694 |

FOREIGN PATENT DOCUMENTS 2 538 594   6/1984   France .

OTHER PUBLICATIONS

Kondo et al "Comparison of an Amide and Amine Salt as Friction Modifiers for a Magnetic Thin Film Medium", ASME 37 (1994), 1, 99–104 Thribology Transactions.

Kondo et al "Development of Modified Perfluoropolyether Tape" Intl. Tribology Conf. Austrie '94 Dec. 5–8, 1994.

Abstract No. 109:58006s of Japanese Published Application 63–077996 (Sony) (8 Apr. 1988), *Chemical Abstracts,* Columbus, Ohio, vol. 109, No. 8, 22 Aug. 1988, p. 197.

Abstract No. 110:176513y of Japanese Published Application 01–09,961 (Sony) (13 Jan. 1989), *Chemical Abstracts,* Columbus, Ohio, vol. 110, No. 20, May 15, 1989, p. 199.

Abstract No. 113:33552m of Japanese Published Application 01–207263 (Sony) (21 Aug. 1989), *Chemical Abstracts,* Columbus, Ohio, vol. 113, No. 4, Jul. 23, 1990, p. 653.

*Patent Abtracts of Japan,* vol. 9, No. 239, (P-391) [1962] Sep. 25, 1985, of Japanese Published Application 60–093638 of 25 May 1985.

*Primary Examiner*—Stevan A. Resan
*Attorney, Agent, or Firm*—Hill & Simpson

[57] ABSTRACT

Disclosed herein is a magnetic recording medium comprising a nonmagnetic substrate, a magnetic thin film layer on said substrate, and a lubricant layer on said magnetic layer, wherein said lubricant layer contains a compound having the formula:

$$RN^+H_3O^-OCRf_1$$

wherein R is a hydrocarbon group which has three or more carbon atoms, and $Rf_1$ is a perfluoropolyether group. This magnetic recording medium has a low coefficient of friction and shows improved wear resistance and durability.

2 Claims, No Drawings

MAGNETIC RECORDING MEDIUM

BACKGROUND OF THE INVENTION

(1) Field of the Invention

This invention relates to magnetic recording media, and more particularly to magnetic recording media of the so-called magnetic thin film layer type which have a magnetic thin film layer formed on a nonmagnetic substrate by vacuum deposition, ion plating, sputtering or the like.

(2) Description of the Prior Art

As magnetic recording media, those of the coating type have hitherto been widely used, which are obtained by coating a nonmagnetic substrate with a magnetic coating material, followed by drying. The magnetic coating material is usually prepared by dispersing a powdery magnetic material, for example, a magnetic powder of an oxide such as $\gamma\text{-}Fe_2O_3$, Co-containing $\gamma\text{-}Fe_2O_3$, $Fe_3O_4$, Co-containing $\gamma\text{-}Fe_3O_4$, a berthollide compound of $\gamma\text{-}Fe_2O_3$ and $Fe_3O_4$, a Co-containing berthollide compound, $CrO_2$, etc. or of an alloy containing Fe, Co, Ni or the like as a main constituent, in an organic binder such as a vinyl chloride-vinyl acetate copolymer, a polyester resin, a polyurethane resin, etc.

With the increasing demand for high density magnetic recording in recent years, much attention has come to be focused on magnetic recording media of the magnetic thin film layer type in which a thin film magnetic layer comprising a magnetic metal or alloy is deposited directly on a nonmagnetic substrate by vacuum deposition, sputtering, ion plating, plating or other similar technique. The magnetic recording media of the magnetic thin film layer type have a number of advantages in regard of magnetic characteristics. For example, this type of magnetic recording media not only has a high coercive force $H_c$ and a high residual magnetic flux density $B_r$, but is able to be produced with an extremely reduced magnetic layer thickness; therefore, the magnetic recording media show remarkably slight demagnetization of magnetic records as well as extremely low thickness loss at the time of reproduction. Furthermore, the magnetic recording media of this type permit an increase in the packing density of the magnetic material, because it is unnecessary to use an organic binder (which is a nonmagnetic material) in the magnetic layer.

However, the magnetic recording media of the magnetic thin film layer type also have a number of drawbacks as to durability, running properties, etc., and there has been a strong request for improvements in the drawbacks.

In order to meet the request, Japanese Patent Application Laid-Open (KOKAI) No. 60-93638 (1985) discloses that the durability, running properties, etc. of the magnetic recording media mentioned above can be improved by coating the surface of the magnetic thin film layer of the recording media with a lubricant, for example, a perfluoropolyether having a carboxyl group at its molecular end, thereby forming a protective layer. This improvement, however, has not yet produced satisfactory results.

SUMMARY OF THE INVENTION

Accordingly, it is an object of this invention to provide a magnetic recording medium of the magnetic thin film layer type which has a low coefficient of friction and shows improved wear resistance and durability.

According to this invention, there is provided a magnetic recording medium comprising a nonmagnetic substrate, a magnetic thin film layer on the substrate, and a lubricant layer on the magnetic layer, wherein the lubricant layer comprises an amine salt compound of a perfluoropolyether containing a carboxyl group at its molecular end.

The magnetic recording medium according to this invention, as above, exhibits excellent running properties, wear resistance and durability, under a wide range of use conditions.

The above and other objects, features and advantages of this invention will become apparent from the following description of some preferred embodiments of this invention and the appended claims.

DESCRIPTION OF PREFERRED EMBODIMENTS

This invention resides in a magnetic recording medium comprising a nonmagnetic substrate, a magnetic thin film layer on the substrate, and a lubricant layer on the magnetic layer, wherein the lubricant layer comprises an amine salt compound of a perfluoropolyether which has a carboxyl group at its molecular end.

In this invention, the amine salt compound of a perfluoropolyether containing a carboxyl group at its molecular end is a compound which has the following general formula (I):

$$RN^+H_3O^-OCRf_1 \qquad (I),$$

or the following general formula (II):

$$RN^+H_3O^-OCRf_2COO^-H_3N^+R \qquad (II).$$

In the above general formulas, R is a hydrocarbon group which has three or more carbon atoms. The hydrocarbon group R may or may not have a double bond, a branched or cyclic structure, or an aromatic ring. $Rf_2$ is a perfluoropolyether group, nonlimitative examples of which include

similarly, $Rf_1$ is a perfluoropolyether group, nonlimitative examples of which include

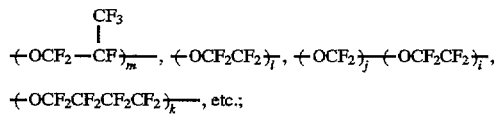
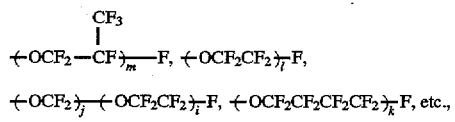

wherein i, j, k, l, m and n are each an integral number. Besides, the perfluoropolyether groups preferably have a molecular weight of from 2000 to 3000.

The compound having the general formula (I) or (II) as above can be obtained by mixing equimolar amounts of carboxyl groups and an amine with heating.

The layer comprising a lubricant according to this invention can be formed by applying a solution of the lubricant in a solvent such as Freon, toluene, isooctane, hexane, etc. to the surface of the magnetic thin film layer by a coating or a spraying method, or by immersing the magnetic thin film layer in the solution, followed by drying.

In this invention, the amount of the lubricant used on the magnetic layer is preferably from 0.5 to 100 mg/m², more preferably from 1 to 20 mg/m². If the amount of the lubricant is excessively small, the effects of lowering coefficient of friction and enhancing wear resistance and durability according to this invention cannot be attained. When the amount of the lubricant is excessively large, on the other hand, the running properties of the magnetic recording medium will rather be worsened due to a sticking phenomenon between a frictional member and the magnetic thin film layer.

Materials usable for the nonmagnetic substrate include: plastics, for example, polyesters such as polyethylene terephthalate, etc., polyolefins such as polyethylene, polypropylene, etc., cellulose derivatives such as cellulose triacetate, cellulose diacetate, cellulose acetate butyrate, etc., vinyl resins such as polyvinyl chloride, polyvinylidene chloride, etc., polycarbonates, polyimides, polyamide-imides, etc.; light metals such as aluminum alloys, titanium alloys, etc.; ceramics such as alumina glass, and so on. The nonmagnetic substrate may take any of such forms as film, tape, sheet, disk, card, drum, etc.

Materials usable for the magnetic thin film layer include, for example, metals such as Fe, Co, Ni, etc., alloys such as Co—Ni alloys, Fe—Co alloys, Fe—Co—Ni alloys, Fe—Co—B alloys, Co—Ni—Fe—B alloys, and these containing Cr, Al or other metal incorporated therein.

The magnetic thin film layer may be deposited on the nonmagnetic substrate by vacuum deposition, ion plating, sputtering or other similar process.

The vacuum deposition process for use here consists in evaporating the above-mentioned magnetic metal material by resistance heating, high-frequency heating, electron beam heating or the like in a vacuum of $10^{-4}$ to $10^{-3}$ Torr to deposit the evaporated metal (magnetic metal material) on the nonmagnetic substrate, and is generally classified into the oblique vacuum deposition process and the perpendicular vacuum deposition process. In the oblique vacuum deposition process, the magnetic metal material is vacuum deposited obliquely to the nonmagnetic substrate, in order to obtain a high coercive force, and the process includes a process in which the oblique vacuum deposition is carried out in an oxygen atmosphere for obtaining a higher coercive force. The perpendicular vacuum deposition process is a process in which a primer metal layer of Bi, Sb, Pb, Sn, Ga, In, Cd, Ge, Si, Tl or the like is preliminarily formed on the nonmagnetic substrate before the magnetic metal material is vacuum deposited perpendicularly to the primer metal layer, in order to enhance deposition efficiency and productivity and to obtain a high coercive force. The ion plating process, which is one of the vacuum deposition and the like techniques, consists in effecting DC glow discharge or RF glow discharge in an inert gas atmosphere at a reduced pressure ranging from $10^{-4}$ to $10^{-3}$ Torr, thereby evaporating the magnetic metal material. The sputtering process is a process in which glow discharge is effected in an atmosphere containing an argon gas as a main component under a reduced pressure of $10^{-3}$ to $10^{-1}$ Torr to produce argon ions, whereby atoms are ejected from the surface of a target. The sputtering process is classified, by the means of glow discharge, into the DC two-pole or three-pole sputtering process, the high-frequency sputtering process, the magnetron sputtering process utilizing magnetton discharge, and so on.

When the magnetic thin film layer formed on the nonmagnetic substrate is coated with the amine salt compound of a perfluoropolyether having a carboxyl group at its molecular end, as described above, a magnetic recording medium having excellent running properties, wear resistance and durability is obtained.

EXAMPLES

Tables 1 to 4 show the compounds used as lubricant in the following examples and comparative examples of this invention. In the tables, each compound is assigned a number (compound No.). In the following description, the compound numbers will be used to represent the respective compounds.

TABLE 1

$RN^+H_3O^-OCRf_2COO^-H_3N^+R$

| Compound No. | $Rf_2$ | R |
|---|---|---|
| (1) | $(OCF_2CF_2)_j(OCF_2)_k$ | n-$C_{18}H_{37}$ (stearyl group) |
| (2) | $(OCF_2CF_2)_j(OCF_2)_k$ | n-$C_{18}H_{35}$ (oleyl group) |
| (3) | $(OCF_2CF_2)_j(OCF_2)_k$ | $-C_6H_5$ (phenyl group) |
| (4) | $(OCF_2CF_2)_j(OCF_2)_k$ | $-C_6H_{11}$ (cyclohexyl group) |
| (5) | $(OCF_2-CF(CF_3))_m$ | n-$C_{18}H_{37}$ (stearyl group) |
| (6) | $(OCF_2-CF(CF_3))_m$ | n-$C_{18}H_{35}$ (oleyl group) |
| (7) | $(OCF_2-CF(CF_3))_m$ | n-$C_{18}H_{31}$ (linolenyl group |

TABLE 2

$RN^+H_3O^-OCRf_1$

| Compound No. | $Rf_1$ | R |
|---|---|---|
| (8) | $F(CF_2CF_2CF_2CF_2O)_k$ | n-$C_{18}H_{37}$ (stearyl group) |

TABLE 3

| Compound No. | $HOOC-Rf_2-COOH$ $Rf_2$ |
|---|---|
| (9) | $(CF_2CF_2O)_l$ |

TABLE 4

| Compound No. | $Rf_1COOH$ $Rf_1$ |
|---|---|
| (10) | $F(CF(CF_3)-CF_2O)_m$ |

In the tables above, $Rf_1$ and $Rf_2$ are each a perfluoropolyether group having a molecular weight of from 2000 to 3000.

EXAMPLE 1

On a polyethylene terephthalate film 14 μm thick, Co was deposited by the oblique vacuum deposition process to form a magnetic thin film layer 1000 Å in film thickness.

Next, compound (1) as a lubricant was applied to the surface of the magnetic thin film layer in a coating weight of 5 mg/m². The polyethylene terephthalate film provided with the magnetic layer and the lubricant layer thereon was cut to a ½ inch width to prepare a sample tape.

EXAMPLES 2–8

Sample tapes were prepared in the same manner as in Example 1 except that compounds (2) to (8) were used as respective lubricants, in place of compound (1).

COMPARATIVE EXAMPLES 1–2

Sample tapes were prepared in the same manner as in Example 1 except that compounds (9) and (10) were used as respective lubricants, in place of compound (1).

The compounds (9) and (10) are perfluoropolyethers having a carboxyl group at its molecular end which are disclosed as lubricant in the aforementioned Japanese Patent Application Laid-Open (KOKAI) No. 60-93638 (1985).

COMPARATIVE EXAMPLE 3

A sample tape was prepared in the same manner as in Example 1 except for not using a lubricant.

For each of the sample tapes prepared in the above Examples and Comparative Examples, coefficient of dynamic friction and shuttle durability were measured under the conditions of a temperature of 25° C. and a relative humidity (RH) of 60%, under the condition of −5° C., and under the conditions of 40° C. and RH 30%. The coefficient of dynamic friction was tested by feeding each sample tape at a tape speed of 5 mm/sec, under a constant tension, using guide pins made of a stainless steel (SUS 304). The shuttle durability was tested by subjecting each sample tape to repeated shuttle running operations, lasting 2 minutes per run, and was evaluated by the number of shuttle runs required for producing a 3-dB lowering in the output from the tape. The still durability was evaluated by the attenuation time for which the sample tape was able to rest in pause before its output was attenuated by 3 dB. The evaluation results for the Examples are shown in Table 5, and those for the Comparative Examples in Table 6.

TABLE 5

| Lubricant | | Conditions | | Coefficient of dynamic friction | Still durability (min) | Shuttle durability (runs) |
|---|---|---|---|---|---|---|
| | | Temp. | RH | | | |
| Example 1 | Compound (1) | 25° C. | 60% | 0.20 | >120 | >150 |
| | | −5° C. | | 0.22 | >60 | >150 |
| | | 40° C. | 30% | 0.23 | >60 | >150 |
| Example 2 | Compount (2) | 25° C. | 60% | 0.21 | >120 | >150 |
| | | −5° C. | | 0.23 | >60 | >150 |
| | | 40° C. | 30% | 0.24 | >60 | >150 |
| Example 3 | Compound (3) | 25° C. | 60% | 0.23 | >120 | >150 |
| | | −5° C. | | 0.24 | >60 | >150 |
| | | 40° C. | 30% | 0.26 | >60 | >150 |
| Example 4 | Compound (4) | 25° C. | 60% | 0.23 | >120 | >150 |
| | | −5° C. | | 0.25 | >60 | >150 |
| | | 40° C. | 30% | 0.27 | >60 | >150 |
| Example 5 | Compound (5) | 25° C. | 60% | 0.21 | >120 | >150 |

TABLE 5-continued

| Lubricant | | Conditions | | Coefficient of dynamic friction | Still durability (min) | Shuttle durability (runs) |
|---|---|---|---|---|---|---|
| | | Temp. | RH | | | |
| | | −5° C. | | 0.21 | >60 | >150 |
| | | 40° C. | 30% | 0.23 | >60 | >150 |
| Example 6 | Compound (6) | 25° C. | 60% | 0.22 | >120 | >150 |
| | | −5° C. | | 0.23 | >60 | >150 |
| | | 40° C. | 30% | 0.25 | >60 | >150 |
| Example 7 | Compound (7) | 25° C. | 60% | 0.23 | >120 | >150 |
| | | −5° C. | | 0.25 | >60 | >150 |
| | | 40° C. | 30% | 0.26 | >60 | >150 |
| Example 8 | Compound (8) | 25° C. | 60% | 0.20 | >120 | >150 |
| | | −5° C. | | 0.21 | >60 | >150 |
| | | 40° C. | 30% | 0.23 | >60 | >150 |

TABLE 6

| Lubricant | | Conditions | | Coefficient of dynamic friction | Still durability (min) | Shuttle durability (runs) |
|---|---|---|---|---|---|---|
| | | Temp. | RH | | | |
| Comparative Example 1 | Compound (9) | 25° C. | 60% | 0.42 | 28 | 78 |
| | | −5° C. | | 0.45 | 17 | 53 |
| | | 40° C. | 30% | 0.44 | 22 | 60 |
| Comparative Example 2 | Compound (10) | 25° C. | 60% | 0.40 | 35 | 85 |
| | | −5° C. | | 0.42 | 20 | 63 |
| | | 40° C. | 30% | 0.41 | 17 | 70 |
| Comparative Example 3 | none | 25° C. | 60% | 0.90 | 2 | 3 |
| | | −5° C. | | — | — | — |
| | | 40° C. | 30% | — | — | — |

As is apparent from comparison between Tables 5 and 6, all the sample tapes prepared in the Examples of this invention exhibited low coefficients of dynamic friction and remarkably stable running, under the room temperature, hot and humid, and low temperature conditions. Furthermore, the tapes according to the Examples of the invention showed extremely favorable surface conditions even after 100 shuttle runs, and, in addition, they did not show a 3-dB lowering in output, even after 150 shuttle runs.

It is clear from the above descriptions that according to this invention an amine salt compound of a perfluoropolyether having a carboxyl group at its molecular end is deposited as a lubricant on a magnetic layer of a magnetic recording medium of the magnetic thin film layer type, and that the magnetic recording medium of this invention has a low coefficient of dynamic friction and excellent running properties, wear resistance and durability.

What is claimed is:

1. A magnetic recording medium comprising:
   a nonmagnetic substrate,
   a magnetic thin film layer on said substrate, and
   a lubricant layer on said magnetic layer,
   wherein said lubricant layer is a single compound having the formula:

$$RN^+H_3O^-OCRf_2COO^-H_3N^+R \qquad (2)$$

wherein R is a straight chain hydrocarbon group which has at least eighteen carbon atoms, and $Rf_2$ is $-(OCR_2CF_2)_j-$  $-(OCR_2)_k-$, wherein j and k are each an integral number.

2. A magnetic recording medium comprising:
   a nonmagnetic substrate,
   a magnetic thin film layer on said substrate, and a lubricant layer on said magnetic layer,
wherein said lubricant layer is a single compound having the formula:

$$RN^+H_3O^-OCRf_2COO^-H_3N^+R \qquad (2)$$

wherein R is n-$C_{18}H_{37}$, and $Rf_2$ is $-(OCF_2CF_2)_j-(OCF_2)_k$, wherein j and k are each an integral number.

* * * * *